Aug. 16, 1960     W. T. HAAG     2,949,200

MULTIPLE DISH CONTAINER

Filed Oct. 13, 1958

INVENTOR.
WILLIAM T. HAAG

United States Patent Office 2,949,200
Patented Aug. 16, 1960

1

2,949,200

MULTIPLE DISH CONTAINER

William T. Haag, Los Angeles, Calif., assignor to Gadget-Of-The-Month Club, Inc., North Hollywood, Calif., a corporation of California Filed Oct. 13, 1958, Ser. No. 766,980

1 Claim. (Cl. 214—310)

Generally speaking, the present invention relates to a multiple dish container and, more particularly, pertains to an improved multiple dish container adapted to store a plurality of dishes in an easily accessible, insertible, removable, and transportable manner, with all of the dishes being arranged in a vertical stack of nested dishes, and in one preferred form, with the multiple dish container being provided with track-engageable roller means adapted for rolling engagement with spaced rails of longitudinal track means whereby to facilitate easy transport of the dish container therealong between various desired stations or locations where dish loading and unloading operations are anticipated.

It is an object of the present invention to provide an improved multiple dish container adapted to store a plurality of dishes in a vertically stacked and nested manner in a longitudinal vertically directed housing having an open top and defining a longitudinal vertically directed dish-receiving chamber therein having a diameter slightly greater than the diameter of each of the plurality of similar dishes adapted to be vertically stacked therein.

It is a further object of the present invention to provide a multiple dish container of the type set forth in the preceding object, including movable ascent and descent platform means positioned within the dish-receiving chamber for underlying abutment with the bottom one of the plurality of dishes adapted to be positioned therein, and provided with manually graspable handle means positioned for convenient manual access from the exterior of the housing to facilitate loading and unloading of said dishes into and out of said chamber.

It is a further object of the present invention to provide a multiple dish container of the type set forth in the preceding object, wherein the longitudinal vertically directed housing is provided with vertical slot means along at least one side thereof and wherein said manually graspable handle means of the movable ascent and descent platform means extends horizontally through said vertical slot means to a position exterior of said housing for convenient manual access.

It is a further object of the present invention to provide a multiple dish container of the type set forth in any of the preceding objects, including track-engageable roller means carried by said housing for engagement with said spaced rails of longitudinal track means for easy transport of said dish-containing housing therealong between desired locations.

It is a further object of the present invention to provide a multiple dish container of the type set forth in any of the preceding objects, including visibly observable scale means indicating the number of dishes of a standard predetermined type carried by the dish-containing housing.

Other and allied objects will be apparent to those skilled in the art after a careful study of the accompanying drawing, the specification, and the appended claim.

2

To facilitate understanding, reference will be made to the hereinbelow-described drawing, in which.

The multiple dish container of the present invention includes a longitudinal vertically directed housing having an open top and defining a longitudinal vertically directed dish-receiving chamber theren having a diameter slightly greater than the diameter of each of a plurality of similar dishes adapted to be vertically stacked therein. In the specific example illustrated, a longitudinal vertically directed housing is indicated generally at 10, the open top is indicated at 11, and the longitudinal vertically directed dish-receiving chamber is positioned within the housing 10, as generally indicated by the directional arrow 12, best seen in Fig. 1. In the specific example illustrated, said housing is also provided with dish-retaining means adjacent the bottom thereof, which is of perforate construction and is indicated at 13. The dishes referred to above are indicated at 14.

Figure 9:
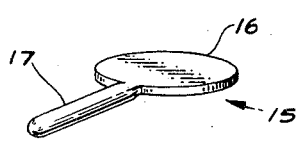
Fig. 9 is a perspective view of the specific form of movable ascent and descent platform means shown in Figs. 1, 2, 3, 5, and 6.

The present invention also includes movable ascent and descent platform means positioned within the dish-receiving chamber for underlying abutment with the bottom one of the plurality of dishes adapted to be positioned therein; said movable ascent and descent platform means being provided with manually graspable handle means positioned for convenient manual access to facilitate loading and unloading of the dishes into and out of the dish-receiving chamber. In the specific example illustrated, said movable ascent and descent platform means is indicated generally at 15, as best seen in Fig. 9, and includes a circular flat disc-shaped portion 16 of an exterior diameter such as to snugly fit within the longitudinal vertically directed dish-receiving chamber indicated by the directional arrow 12 in Fig. 1, and positioned within the longitudinal vertically directed housing 10. In the specific example illustrated, the manually graspable handle means of the movable ascent and descent platform means 15 extends horizontally from the flat disc-shaped platform 16 and is indicated at 17.

Figure 1:
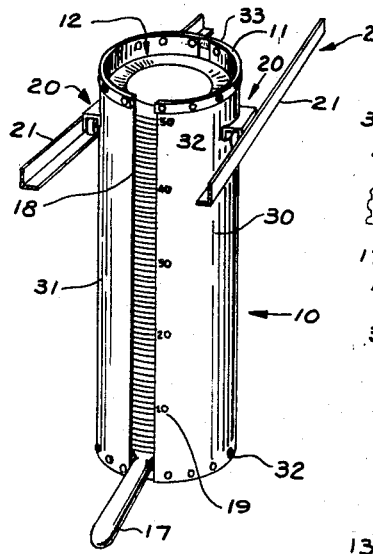
Fig. 1 is a perspective view of one illustrative embodiment of the present invention carrying a full load of 50 dishes in vertically stacked position therein, and showing track-engageable roller means in rollable engagement with a fragmentary portion of spaced rails of longitudinal track means for easy transport of the dish container between desired locations.
Figure 2:
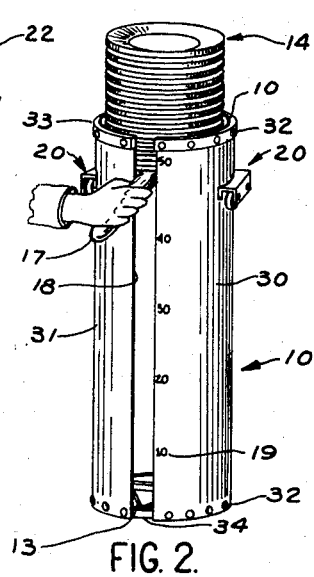
Fig. 2 is a perspective view similar to Fig. 1, but with the track means removed and with the movable ascent and descent platform means shown in use during a dish-loading operation.
Figure 3:
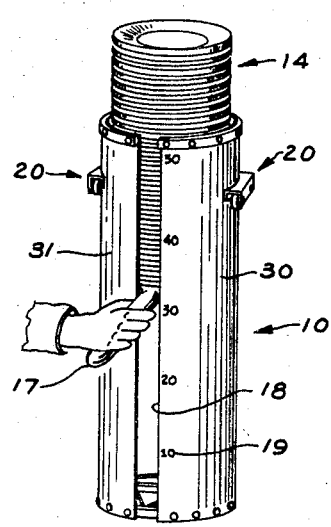
Fig. 3 is a perspective view similar to Fig. 2, but shows the movable ascent and descent platform means in a second position during a dish-loading operation occurring subsequent to the first position in a dish-loading operation shown in Fig. 2.
Figures 5, 7:
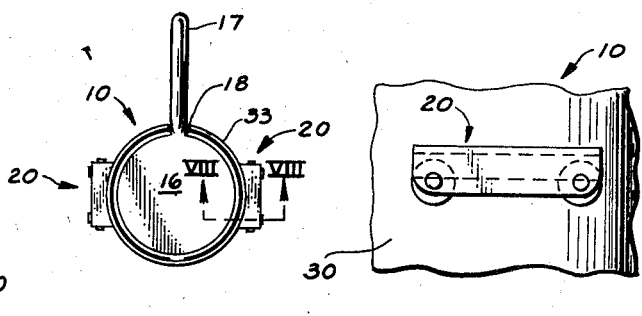
Fig. 5 is a top plan view of Fig. 4.
Fig. 7 is an enlarged side elevational view showing one of the track-engageable roller means carried by one side of the dish-containing housing.
Figure 4:
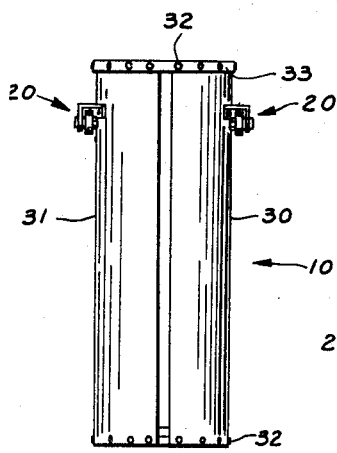
Fig. 4 is a rear elevational view of the multiple dish container illustrated in Figs. 1–3.
Figure 6:
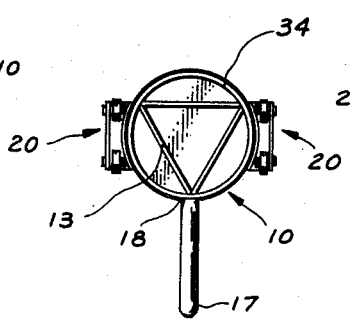
Fig. 6 is a bottom plan view of Fig. 4.
Figure 8:
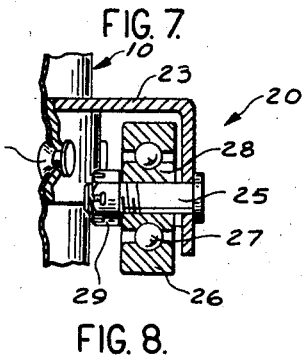
Fig. 8 is an enlarged sectional view taken in the direction of the arrows VIII—VIII in Fig. 5.

In order to allow the handle 17 to be positioned exterior of the housing 10 to facilitate loading and unloading of the dishes 14, the housing 10, in the specific example illustrated, is provided with vertical slot means 18 through which the handle 17 horizontally extends, as is clearly shown in Figs. 1, 2, 3, 5, and 6, to a position where it may be manually grasped to facilitate a loading operation such as is shown in sequence in Figs. 2 and 3 and/or to facilitate an unloading operation comprising the reverse thereof. It will readily be understood that the loading operation shown in sequence in Figs. 2 and 3, consists of manually grasping the handle 17 and moving it to a position near the open top 11 of the housing 10 so that a stack of dishes 14 may be placed on the flat disc-shaped portion 16 of the platform means 15 in the position shown in Fig. 2, after which the handle 17 may be lowered to the position shown in Fig. 3 to allow a second stack of dishes 14 to be vertically placed on top of the first stack of dishes 14. This operation may be repeated until the container is full as is shown in Fig. 1. Furthermore, it should be noted that any desired number of dishes comprising a stack may be loaded on the platform 15 during each individual loading operation. The loading stack may be large or small as desired and as convenient.

In the specific example illustrated, the longitudinal vertically directed housing 10 is provided with visibly observable vertically extending scale means 19 indicating the number of dishes stacked within the housing 10 by comparing the numerical designation of the scale with the level of the top dish seen through the vertical slot 18. For example, Fig. 1 shows the housing as containing a total of 50 dishes.

One form of the present invention may include track-engageable roller means carried by the housing for engagement with spaced rails of longitudinal track means for easy transport of the dish-containing housing therealong between various desired locations where dish loading and/or unloading operations are to occur. In the specific example illustrated, there are two such track-engageable roller means, indicated generally at 20, carried by the exterior of the housing 10 in direct spaced opposition to each other, and each is adapted to engage the spaced rails, such as indicated at 21, of longitudinal track means indicated generally at 22 and comprising inwardly facing angle irons or the like, whereby the entire housing 10 may be rolled along the rails 21 between various locations therealong. In the specific example illustrated, each track-engageable roller means 20 comprises a supporting bracket 23 fastened by suitable rivet means 24 to the exterior of the housing 10 and carrying two axles 25, each having an annular roller 26 mounted by ball bearing means 27 with respect to a circular central portion 28 held on the corresponding shaft 25 by fastening nut means 29, thus providing two horizontally aligned rollers on each side of the housing 10 adapted to roll along the corresponding rails 21.

While the housing 10 is shown as being constructed of two pieces, 30 and 31, of sheet metal material fastened by suitable rivet means 32 at the top and bottom thereof to an interrupted metal ring 33 at the top thereof and a continuous metal ring 34 at the bottom thereof, and while the dish-retaining means 13 at the bottom of the housing 10 is shown as being of metal strap construction fastened to the continuous bottom metal ring 34 at three points, it should be noted that the material and mode of construction of the elements just described may be modified substantially from the specific example illustrated in the figures. This is also true of the movable ascent and descent platform means 15, the track-engageable roller means 20, and/or the longitudinal track means 22.

Numerous modifications and variations of the present invention will occur to those skilled in the art after a careful study hereof. All such, properly within the basic spirit and scope of the present invention are intended to be included and comprehended herein as fully as if specifically described, illustrated, and claimed herein.

The exact compositions, configurations, constructions, relative positionings, and cooperative relationships of the various component parts of the present invention are not critical, and can be modified substantially within the spirit of the present invention.

The embodiment of the present invention specifically described and illustrated herein is exemplary only, and is not intended to limit the scope of the present invention, which is to be interpreted in the light of the prior art and the appended claim only, with due consideration for the doctrine of equivalents.

I claim:

A multiple dish container adapted to store a plurality of dishes in an easily accessible, insertible, removable, and transportable manner, comprising: a longitudinal vertically directed housing having perforate dish-retaining means adjacent the bottom thereof and having an open top and defining a longitudinal vertically directed dish-receiving chamber therein having a diameter slightly greater than the diameter of each of a plurality of similar dishes adapted to be vertically stacked therein, said housing being provided with vertical slot means; and movable ascent and descent platform means positioned within said chamber for underlying abutment with the bottom one of the plurality of dishes adapted to be positioned therein, and provided with manually graspable handle means extending directly horizontally outwardly through said vertical slot in said housing for convenient manual access from the exterior of the housing to facilitate loading and unloading of said dishes into and out of said chamber; longitudinal horizontal track means consisting of spaced horizontal rails adapted to communicate two horizontally spaced stations between which the housing is to be moved; and downwardly directed horizontally rollable track-engageable roller means carried by said housing above the center of gravity thereof for horizontal rolling engagement with said spaced horizontal rails of said longitudinal horizontal track means for easy transport of said dish-containing housing therealong and therebetween.

References Cited in the file of this patent

UNITED STATES PATENTS

| | | |
|---|---|---|
| 2,251,873 | Gibbs | Aug. 5, 1941 |
| 2,643,928 | Barker | June 30, 1953 |

UNITED STATES PATENT OFFICE
CERTIFICATION OF CORRECTION

Patent No. 2,949,200                          August 16, 1960

William T. Haag

It is hereby certified that error appears in the above numbered patent requiring correction and that the said Letters Patent should read as corrected below.

In the grant, lines 2 and 3, for "assignor to Gadget-Of-The-Month Club, Inc., of North Hollywood, California, a corporation of California," read -- assignor of one-tenth to Gadget-Of-The-Month Club, Inc., of North Hollywood, California, a corporation of California, --; line 12, for "Gadget-Of-The-Month Club, Inc., its successors" read -- William T. Haag, his heirs or assigns, and Gadget-Of-The-Month Club, Inc., its successors --; in the heading to the printed specification, lines 3, 4, and 5, for "assignor to Gadget-Of-The-Month Club, Inc., North Hollywood, Calif. a corporation of California" read -- assignor of one-tenth to Gadget-Of-The-Month Club, Inc., North Hollywood, Calif., a corporation of California --.

Signed and sealed this 18th day of April 1961.

(SEAL)
Attest:

ERNEST W. SWIDER                                      DAVID L. LADD
Attesting Officer                                        Commissioner of Patents